Patented May 25, 1948

2,442,196

UNITED STATES PATENT OFFICE 2,442,196

MODIFIED METHYL POLYSILOXANE COMPOSITIONS

Almy D. Coggeshall, Schenectady, N. Y., assignor to General Electric Company, a corporation of New York No Drawing. Application November 9, 1944, Serial No. 562,737

8 Claims. (Cl. 260—42)

The present invention relates to modified methyl polysiloxane resinous compositions. It is particularly concerned with compositions comprising heat-hardenable methyl polysiloxane resins modified with dimethyl silicone gums.

Methyl polysiloxane resins, also known as methyl silicone resins, are described and claimed, for example, in Rochow Patent 2,258,218 and in application Serial No. 393,843, filed May 16, 1941, in the name of E. G. Rochow and assigned to the same assignee as the present invention. As is brought out in the above-mentioned patent and application, heat-hardenable methyl polysiloxane resins can be prepared, for example, by hydrolysis of suitable mixtures of methyl silicon halides or mixtures of methyl silicon halides and a silicon tetrahalide, in such proportions that the mixtures contain an average of from 1 to substantially less than 2, preferably from 1.3 to 1.7 methyl groups per silicon atom. The liquid hydrolysis and condensation products are resinous materials which may be further condensed or polymerized to a solid state. Because of this property, these polysiloxane resins are useful as such or in solution in a suitable solvent as heat-hardenable coating and impregnating compositions. The heat-hardened products are in general characterized by very good heat resistance as compared with ordinary organic resins. However, the heat-hardened products, particularly those obtained from methyl polysiloxanes having a methyl-to-silicon ration such that the liquid resins can be readily converted to a solid state by heat alone, are not entirely suitable for some applications due to insufficient flexibility in the heat-hardened state.

The present invention is based on my discovery that by modifying these heat-hardenable methyl polysiloxane resins or solutions thereof with dimethyl silicone gums, products may be obtained which in the heat-hardened state are characterized by flexibility, heat-stability, high dielectric strength, and a solvent resistance which in many cases is superior to that of the unmodified methyl siloxane resin. The gums which may be employed in the practice of this invention are those obtained by treating a liquid dimethyl silicone with a suitable metal halide, such as ferric chloride hexahydrate. Detailed methods of preparing these gums or solid, elastic products are set forth, for example, in the copending application Serial No. 526,473, filed March 14, 1944, in the name of Maynard C. Agens, and in application Serial No. 532,879, filed April 26, 1944, in the name of James G. E. Wright, both of which applications are assigned to the same assignee as the present invention. These dimethyl silicone gums having a methyl-to-silicon ratio of from 1.98 to 2.00 are prepared, for example, from the hydrolysis product of a pure dimethyldihalogenosilane or a dimethyldihalogenosilane containing not more than 2 mol per cent of a methyl trihalogenosilane (stated alternatively, the said solid, elastic products are obtained by condensing a liquid consisting of polymeric dimethylsiloxane containing up to 2 mol per cent copolymerized monomethylsiloxane) can be divided into two groups, one, the soluble gums having a methyl-to-silicon ratio of 2, and two, the insoluble gums having a methyl-to-silicon ratio of at least 1.98 but less than 2. It will be noted from the methods of preparing these gums, that all of the methyl silicone silicon atoms are connected to at least one methyl radical, at least 98 per cent of the silicon atoms being connected to two methyl radicals.

Either of the two types of gums, both of which are elastic products, may be used for modifying methyl polysiloxane resins in the practice of my invention. With the soluble gums it is only necessary to mix a suitable solution of the gum with a solution of the methyl polysiloxane resin in the desired proportions. Since the presence of the ferric chloride or other methyl halide catalyst in the soluble gum causes a depolymerization thereof when dissolved in a solvent such as toluene, xylene, or benzene, the gum should be washed prior to solution thereof or the solution should be prepared in accordance with the process described and claimed in the copending application Serial No. 562,564 of Donald W. Scott, filed November 8, 1944, now U. S. Patent 2,430,032, issued November 4, 1947, and assigned to the same assignee as the present invention. The insoluble gums, that is the gums having a methyl-to-silicone ratio less than 2, must be milled together with the resin in order to obtain a proper blending thereof and the formation of a soluble mass, as will be described more fully hereinafter. The proportions of gum to methyl polysiloxane resins are not critical. When the gum comprises approximately 20 per cent of the solid content of the mixture, a marked improvement in the flexibility of most methyl polysiloxane resins is noted. As the proportion of gum is increased to approximately ⅓ of the total solid content, films of the resultant compositions are found to possess elasticity as well as flexibility. The elasticity of the films becomes more pronounced with continued increase in the proportion of gum. When the gum content exceeds about 66 per cent of the total solid content, a gradual decrease in the dielectric strength of the films is noted. In general I prefer to employ compositions containing from about 45 to 55 per cent by weight of the gum solids based on the total solid content of the mixture.

As was previously stated, the insoluble gums are compounded with the resins by working and mixing the two materials together using milling rolls, colloidal mills, Banbury mixer or the like. This method is particularly adapted for use with the high molecular weight resins such as those prepared by treating the liquid methyl polysiloxane resins in solution and at elevated temperatures with certain catalysts comprising a hydrated metal salt selected from the class consisting of hydrated ferric chloride, ferrous chloride, stannic chloride and copper sulphate as described and claimed in the copending application of James G. E. Wright and James Marsden, Serial No. 455,615, (Patent 2,389,477) filed August 21, 1942, and assigned to the same assignee as the present invention. For best results, I prefer to employ the high molecular weight solvent extracted resins described and claimed in the copending application Serial No. 536,435, (Patent 2,405,041) filed May 19, 1944, in the name of Kenneth N. Mathes and Bridget A. Wasiewicz, and assigned to the same assignee as the present invention.

In accordance with one method of combining the gum with these high-molecular weight, "precondensed" resins, the gum is placed on suitable rubber milling rolls where, due to its tackiness, it forms a belt around one roll. A solution of the resin, for example, a 75 per cent toluene solution of the resin obtained by treating the hydrolysis product of a mixture of 50 parts of dimethyldichlorosilane, 20 parts trimethylchlorosilane, and 20 parts silicon tetrachloride with ferric chloride hexahydrate and antimony pentachloride is slowly poured over the masticated gum on the revolving rolls. The rolls may either be at room temperature or heated to 70–80° C. The use of hot rolls evaporates the solvent from the varnish, so that the product is less sticky and therefore easier to handle. If the varnish is added more rapidly than the gum can absorb it, free varnish will be lost from the under side of the rolls. The rolls are best set coarse for this part of the operation. When all the varnish has been added, the mass is milled until homogeneous, using fine set rolls. At this state, the product is a soft leathery-looking mass. About 20 minutes' milling time is usually adequate for small batches.

The resultant product is cut into small lumps and allowed to soak for from ½ to 12 hours in about 2.5 times its own weight in a solvent such as toluene, after which the mixture is stirred mechanically until the lumps are smoothed out to a viscous liquid. The remainder of the solvent is then added together with the catalyst or catalysts necessary to promote the cure of the resin and elastic product in order to bring the varnish to the desired viscosity. The solvent is not restricted as to type, but a high boiling solvent tends to prevent skinning. Mineral spirits (a petroleum fraction boiling about 180°) and solvent naphtha (an industrial xylene) are examples of suitable high boiling solvents.

In some cases it is desirable to add to the resultant (varnish) agents capable of promoting the cure of the resin and gum. These are generally added before all the solvent is added.

Examples of suitable curing agents for the resin are given in the copending application Serial No. 549,135, filed August 11, 1944, in the name of C. E. Welsh and assigned to the same assignee as the present invention. I prefer to employ a lead salt such as lead naphthenate in an amount corresponding to about 0.3 per cent lead based on the total resin solids. Benzoyl peroxide, to the extent of 2 per cent based on the weight of the gum, may be added to accelerate the cure of the gum component. The effect of this material on silicone gums is more fully described in the copending application Serial No. 526,472, filed March 14, 1944, in the name of James G. E. Wright and Curtis S. Oliver and assigned to the same assignee as the present invention. Both the resin and gum catalysts are generally added in the form of a solution in toluene or the like.

The resultant solutions are particularly useful for coating and impregnating purposes. A low temperature bake to remove the solvents followed by a short bake at 200–250° C. is ordinarily sufficient to cure the resin-gum composition. The baking time is not critical except that it should not be less than about 7–10 minutes at 200° C. Overbaking does no damage if the time does not exceed 8 to 10 hours at 250° C.

Glass and asbestos tapes and fabrics coated and impregnated with methyl polysiloxane-methyl silicone gum compositions containing approximately equal parts by weight of the resin and gum exhibit dielectric strengths in the neighborhood of 1,000 volts per mil and a power factor at room temperature of from .0014 to .0021. These products are particularly useful for wrapping and insulating complicated curved sections of electrical apparatus where because of the greater flexibility and elasticity of the modified film the impregnated cloth can be distorted and stretched on the bias without tearing the resin and without seriously decreasing the dielectric strength of the resin film. Glass fiber tapes coated and impregnated with these modified resins show no tendency to lose dielectric strength at temperatures up to 200° C. When used as wrapped insulation for electrical coils, these tapes have been found to retain 90 per cent of their original dielectric strength after being heated for 1000 hours at 200° C. In general the solvent-resistance of the films is superior to the solvent-resistance of the unmodified resin films.

The modified resins can also be used for applications other than electrical applications. For example, sheets of the modified resins with or without a fabric backing can be used in the manufacture of gaskets. Because of the exceptional flexibility of the modified resins at temperatures as low as −50° C. they may also be employed in the manufacture of gas-impervious sheeting suitable for the manufacture of gas-tight couplings, conduits, and the like.

What I claim as new and desire to secure by Letters Patent of the United States is:

1. A composition of matter comprising a mixture selected from the class consisting of (1) a mixture of (a) a hydrocarbon-soluble dimethyl silicone solid elastic product having a methyl-to-silicon ratio of from 1.98 to 2.00 and in which all of the silicon atoms are connected to at least one methyl radical and at least 98 per cent of the silicon atoms are connected to two methyl radicals, the said elastic product having been obtained by condensing a liquid consisting of polymeric dimethylsiloxane containing up to two mol per cent copolymerized monomethylsiloxane, and (b) a heat-hardenable methylpolysiloxane resin having a methyl-to-silicon ratio of from 1.0 to 1.7, and (2) the product of milling of a mixture of ingredients comprising (a) an insoluble solid elastic dimethyl silicone product having a methyl-to-silicon ratio of at least 1.98 and less than 2.00 and in which all of the silicon atoms are connected to at least one methyl radical and at least 98 per cent of the silicon atoms are connected to two methyl groups, the said elastic product having been obtained by condensing a liquid consisting of polymeric dimethylsiloxane containing up to two mol per cent copolymerized monomethylsiloxane, and (b) a soluble, high molecular weight, heat-hardenable methylpolysiloxane resin having a methyl-to-silicon ratio of from 1.0 to 1.7, each of the aforesaid elastic products in (1) and (2) comprising from 20 to 66 per cent, by weight, of the mixture of the elastic dimethyl silicone and the methylpolysiloxane resin.

2. A composition of matter comprising the product of milling of a mixture of ingredients comprising (1) an insoluble solid elastic dimethyl silicone product having a methyl-to-silicon ratio of at least 1.98 and less than 2.00 and in which all of the silicon atoms are connected to at least one and not more than two methyl groups, the said elastic product having been obtained by condensing a liquid consisting of polymeric dimethylsiloxane containing up to 2 mol per cent copolymerized monomethylsiloxane, and (2) a soluble high molecular weight, heat-hardenable methyl polysiloxane resin having a methyl-to-silicon ratio of from 1.3 to 1.7, the said elastic product comprising from 20 to 66 percent by weight of the mixture of (1) and (2).

3. A composition of matter comprising a solution in an inert organic solvent of (1) a hydrocarbon-soluble dimethyl silicone solid elastic product having a methyl-to-silicon ratio of from 1.98 to 2.00 and in which all of the silicon atoms are connected to at least one and not more than two methyl groups, the said elastic product having been obtained by condensing a liquid consisting of polymeric dimethylsiloxane containing up to 2 mol per cent copolymerized monomethylsiloxane, and (2) a soluble methyl polysiloxane resin having a methyl-to-silicon ratio of from 1.3 to 1.7, the said elastic product comprising from 20 to 66 percent by weight of the mixture of (1) and (2).

4. A coating composition comprising (1) a hydrocarbon-soluble dimethyl silicone solid elastic product containing an average of from 1.98 to 2.00 methyl groups per silicon atom and in which all of the silicon atoms are connected to at least one and not more than two methyl groups, the said elastic product having been obtained by condensing a liquid consisting of polymeric dimethylsiloxane containing up to 2 mol per cent copolymerized monomethylsiloxane, and (2) a methyl polysiloxane resin obtained by refluxing a solution of a liquid methyl polysiloxane resin in an aromatic hydrocarbon solvent in contact with a catalyst comprising a hydrated metal salt selected from the group consisting of hydrated ferric chloride, ferrous chloride, stannic chloride and copper sulphate, said polysiloxane resin containing an average of from one to 1.7 methyl groups attached to each silicon atom, the said elastic product comprising from 20 to 66 percent by weight of the mixture of (1) and (2).

5. A composition of matter soluble in aromatic hydrocarbon solvents, said composition comprising a homogeneous product of milling of a mixture of (1) an insoluble dimethyl silicone soluble elastic product having a methyl-to-silicon ratio of at least 1.98 and less than 2.00 and in which all of the silicon atoms are connected to at least one and not more than two methyl groups, the said elastic product having been obtained by condensing a liquid consisting of polymeric dimethylsiloxane containing up to 2 mol per cent copolymerized monomethylsiloxane, and (2) a soluble high molecular weight methyl polysiloxane resin having a methyl-to-silicon ratio of from 1.3 to 1.7, the said elastic product comprising from 45 to 55 percent by weight of the mixture of (1) and (2).

6. The process which comprises masticating an insoluble dimethyl silicone solid elastic product having a methyl-to-silicon ratio of at least 1.98 and less than 2.00 and in which all of the silicon atoms are connected to at least one methyl radical and at least 98 percent of the silicon atoms are connected to two methyl radicals, the said elastic product having been obtained by condensing a liquid consisting of polymeric dimethylsiloxane containing up to 2 mol per cent copolymerized monomethylsiloxane, and, while continuing the mastication of said gum, slowly adding thereto a solution of a high molecular weight methyl polysiloxane resin having an average of from one to 1.7 methyl groups per silicon atom, the said elastic product comprising from 20 to 66 per cent, by weight, of the total weight of the latter and the methylpolysiloxane resin.

7. The process of preparing a soluble mixture of (1) an insoluble dimethyl silicone solid elastic product containing an average of from 1.98 to less than two methyl groups per silicon atom and in which all of the silicon atoms are connected to at least one and not more than two methyl groups, the said elastic product having been obtained by condensing a liquid consisting of polymeric dimethylsiloxane containing up to 2 mol per cent copolymerized monomethylsiloxane, and (2) a heat-hardenable methyl polysiloxane resin having a methyl-to-silicon ratio of from 1.3 to 1.7 which process comprises slowly adding a solution of the heat-hardenable methyl polysiloxane resin to the insoluble dimethyl silicone elastic product while the latter is being milled on mixing rolls at an elevated temperature sufficient to evaporate the solvent present in said methyl polysiloxane resin solution, the said elastic product being present in an amount equal to from 20 to 66 per cent, by weight, of the total weight of the latter and the methylpolysiloxane resin.

8. The process of preparing a soluble mixture of (1) an insoluble dimethyl silicone solid elastic product containing an average of from 1.98 to less than two methyl groups per silicon atom and in which all of the silicon atoms are connected to at least one and not more than two methyl groups, the said elastic product having been obtained by condensing a liquid consisting of polymeric dimethylsiloxane containing up to 2 mol per cent copolymerized monomethylsiloxane, and (2) a heat-hardenable methyl polysiloxane resin obtained by refluxing a solution of a methyl polysiloxane resin containing an average of from one to 1.7 methyl groups per silicon atom with a catalyst comprising a hydrated metal salt selected from the class consisting of hydrated ferric chloride, ferrous chloride, stannic chloride and copper sulphate, the said solid elastic product comprising from 20 to 66 per cent, by weight, of the total weight of the latter and the methylpolysiloxane resin, which process comprises mechanically working a solution of the heat-hardenable methyl polysiloxane resin into the insoluble dimethyl silicone elastic product.

ALMY D. COGGESHALL.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |

Certificate of Correction

Patent No. 2,442,196.  ALMY D. COGGESHALL  May 25, 1948.

It is hereby certified that error appears in the printed specification of the above numbered patent requiring correction as follows: Column 5, line 75, claim 5, for the word "soluble" read *solid*; and that the said Letters Patent should be read with this correction therein that the same may conform to the record of the case in the Patent Office.

Signed and sealed this 17th day of August, A. D. 1948.

[SEAL]

THOMAS F. MURPHY,
*Assistant Commissioner of Patents.* methyl polysiloxane resin into the insoluble dimethyl silicone elastic product.

ALMY D. COGGESHALL.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |

Certificate of Correction

Patent No. 2,442,196.　　ALMY D. COGGESHALL　　May 25, 1948.

It is hereby certified that error appears in the printed specification of the above numbered patent requiring correction as follows: Column 5, line 75, claim 5, for the word "soluble" read *solid*; and that the said Letters Patent should be read with this correction therein that the same may conform to the record of the case in the Patent Office.

Signed and sealed this 17th day of August, A. D. 1948.

[SEAL]

THOMAS F. MURPHY,
*Assistant Commissioner of Patents.*